US008630400B2

(12) United States Patent
Arao et al.

(10) Patent No.: US 8,630,400 B2
(45) Date of Patent: Jan. 14, 2014

(54) TELEPHONE RELAY SYSTEM, TELEPHONE RELAY APPARATUS, RECORDING MEDIUM AND DATA PROCESSING METHOD

(75) Inventors: Shinya Arao, Tokyo (JP); Teruharu Serada, Tokyo (JP); Takayuki Omino, Tokyo (JP); Yasuaki Tsunemi, Tokyo (JP); Michio Nishioka, Tokyo (JP); Kenichi Kamiya, Tokyo (JP)

(73) Assignee: NEC Corporation, Tokyo (JP)

( * ) Notice: Subject to any disclaimer, the term of this patent is extended or adjusted under 35 U.S.C. 154(b) by 879 days.

(21) Appl. No.: 12/537,144

(22) Filed: Aug. 6, 2009

(65) Prior Publication Data

US 2010/0040223 A1   Feb. 18, 2010

(30) Foreign Application Priority Data

Aug. 18, 2008   (JP) ................................ 2008-209677

(51) Int. Cl.
*H04M 3/42*   (2006.01)

(52) U.S. Cl.
USPC ............ 379/211.02; 379/201.01; 379/207.03; 379/212.01; 455/417; 709/228; 709/229

(58) Field of Classification Search
USPC .................... 348/14.01–14.16; 370/259–271, 370/351–356; 709/201–207, 217–248; 379/142.01–142.18, 201.01–218.02, 379/221.01–221.15, 372–376.02; 455/550.1–560, 412.1–426.2, 455/575.1–575.9, 90.1–90.3
See application file for complete search history.

(56) References Cited

U.S. PATENT DOCUMENTS

| | | | | | |
|---|---|---|---|---|---|
| 4,873,717 | A | * | 10/1989 | Davidson et al. | 379/157 |
| 5,428,678 | A | * | 6/1995 | Fitzpatrick et al. | 379/201.02 |
| 5,592,541 | A | * | 1/1997 | Fleischer et al. | 379/211.02 |
| 5,930,700 | A | * | 7/1999 | Pepper et al. | 455/435.3 |
| 5,930,702 | A | * | 7/1999 | Goldman et al. | 455/417 |
| 5,933,778 | A | * | 8/1999 | Buhrmann et al. | 455/461 |
| 6,167,043 | A | * | 12/2000 | Frantz | 370/356 |
| 6,192,254 | B1 | * | 2/2001 | Carlsen et al. | 455/552.1 |
| 6,249,815 | B1 | * | 6/2001 | Foladare et al. | 709/223 |

(Continued)

FOREIGN PATENT DOCUMENTS

| JP | 4-65957 A | 3/1992 |
|---|---|---|
| JP | 4-246957 A | 9/1992 |

(Continued)

OTHER PUBLICATIONS

Japanese Office Action for JP2008-209677 mailed on Oct. 30, 2012.

(Continued)

*Primary Examiner* — Hemant Patel

(57) ABSTRACT

When a telephone call line from an outgoing telephone terminal to the specific telephone terminal of a specific terminal user is not opened, the telephone relay apparatus acquires periphery requirement data from user scheduled data about the specific terminal user having a scheduled date matching the present date, and selects a peripheral telephone terminal. Opening of a telephone call line from the outgoing telephone terminal to the selected peripheral telephone terminal is tried, and the outgoing telephone terminal not connected to the specific telephone terminal is connected to the peripheral telephone terminal. Thus, it is possible to increase the possibility that the telephone outgoing user and the specific terminal user can talk to each other between the peripheral telephone terminal and the outgoing telephone terminal.

15 Claims, 6 Drawing Sheets

(56) References Cited

U.S. PATENT DOCUMENTS

| | | | |
|---|---|---|---|
| 6,404,858 B1* | 6/2002 | Farris et al. | 379/88.02 |
| 6,477,374 B1* | 11/2002 | Shaffer et al. | 455/445 |
| 6,625,258 B1* | 9/2003 | Ram et al. | 379/88.13 |
| 6,751,459 B1* | 6/2004 | Lee et al. | 455/445 |
| 6,898,274 B1* | 5/2005 | Galt et al. | 379/211.02 |
| 6,907,031 B1* | 6/2005 | Ehlinger et al. | 370/352 |
| 7,203,294 B2* | 4/2007 | Carnazza et al. | 379/142.07 |
| 7,215,753 B2* | 5/2007 | Parra Moyano et al. | 379/211.02 |
| 7,248,686 B2* | 7/2007 | Mahajan et al. | 379/211.02 |
| 7,869,799 B2* | 1/2011 | Adams et al. | 455/417 |
| 2005/0008137 A1* | 1/2005 | Naito | 379/211.02 |
| 2005/0201362 A1* | 9/2005 | Klein et al. | 370/352 |
| 2005/0215243 A1* | 9/2005 | Black et al. | 455/417 |

FOREIGN PATENT DOCUMENTS

| | | |
|---|---|---|
| JP | 5-83400 A | 4/1993 |
| JP | 5-110691 A | 4/1993 |
| JP | H08-088681 A | 4/1996 |
| JP | H08-242300 A | 9/1996 |
| JP | 9-224089 A | 8/1997 |
| JP | 2000-49947 A | 2/2000 |
| JP | 2001-346236 A | 12/2001 |
| JP | 2004-343492 A | 12/2004 |
| JP | 2007-165992 A | 6/2007 |

OTHER PUBLICATIONS

Japanese Office Action for JP 2008-209677 mailed on Apr. 23, 2013 with Partial English Translation.

* cited by examiner

FIG. 3

| TELEPHONE NUMBER | ID DATA |
|---|---|
| COMPANY MOBILE-PHONE NUMBER x x | COMPANY MOBILE-PHONE USER x x |
| COMPANY MOBILE-PHONE NUMBER y y | COMPANY MOBILE-PHONE USER y y |
| ⋮ | ⋮ |
| COMPANY FIXED-LINE TELEPHONE NUMBER x x | OFFICE TELEPHONE x x |
| COMPANY FIXED-LINE TELEPHONE NUMBER y y | OFFICE TELEPHONE y y |
| COMPANY FIXED-LINE TELEPHONE NUMBER z z | CONFERENCE ROOM TELEPHONE z z |
| ⋮ | ⋮ |
| PERSONAL MOBILE-PHONE NUMBER x x | PERSONAL MOBILE-PHONE USER x x |
| PERSONAL MOBILE-PHONE NUMBER y y | PERSONAL MOBILE-PHONE USER y y |
| ⋮ | ⋮ |

FIG. 4A

|  | 01 (MON) | 02 (TUE) | 03 (WED) | 04 (THU) | 05 (FRI) |
|---|---|---|---|---|---|
| COMPANY MOBILE-PHONE USER xx | | | | | |
| 09-10 | MEETING AT CONFERENCE ROOM xx | | OUTSIDE WORK WITH USER yy | | |
| 10-11 | | DISCUSSION WITH USER yy | | | OUTSIDE WORK WITH USER zz |
| 11-12 | | | | MEETING AT CONFERENCE ROOM xx | |
| 12-13 | | | | | |
| 13-14 | BUSINESS TRIP (NOT RETURNING) | | | | |
| 14-15 | | MEETING AT CONFERENCE ROOM zz | | | |
| 15-16 | | | | | |
| 16-17 | | | | | |

FIG. 4B

|  | 01 (MON) | 02 (TUE) | 03 (WED) | 04 (THU) | 05 (FRI) |
|---|---|---|---|---|---|
| COMPANY MOBILE-PHONE USER yy | | | | | |
| 09-10 | MEETING AT CONFERENCE ROOM zz | | OUTSIDE WORK WITH USER xx | | MEETING AT CONFERENCE ROOM yy |
| 10-11 | | DISCUSSION WITH USER xx | | BUSINESS TRIP | |
| 11-12 | | | | | |
| 12-13 | | | | | |
| 13-14 | | | | | |
| 14-15 | | MEETING AT CONFERENCE ROOM zz | | | |
| 15-16 | | | | | |
| 16-17 | | | | | |

TELEPHONE RELAY SYSTEM, TELEPHONE RELAY APPARATUS, RECORDING MEDIUM AND DATA PROCESSING METHOD

This application is based upon and claims the benefit of priority from Japanese patent application No. 2008-209677, filed on Aug. 18, 2008, the disclosure of which is incorporated heroin in its entirety by reference.

BACKGROUND

1. Technical Field

The present invention relates to a telephone relay system that opens a communication line to the specific telephone terminal of a specific terminal user in response to a line connecting request from the outgoing telephone terminal of a telephone outgoing user. The present invention also relates to a telephone relay apparatus provided in the telephone relay system, and a recording medium and a data processing method to be executed and implemented in the telephone relay apparatus.

2. Related Art

At present, in a large company or the like, a specific terminal user such as an employee is lent an in-office specific telephone terminal which forms a part of a telephone relay system. In such a telephone relay system, a line connecting request from the outgoing telephone terminal of a telephone outgoing user outside the company is received by a telephone relay apparatus provided in the company, and is relayed to the specific telephone terminal of a specific terminal user.

To boost the convenience of telephone call relays, a telephone relay system has been suggested to constantly detect the location of an employee in a company with an ID card, and relay a line connecting request from an outgoing telephone terminal to the fixed-line telephone terminal located at the location detected with the ID card (see Japanese Laid-open Patent Publication No. 04-246957, for example).

There also has been a telephone relay system that selects an in-house fixed-line extension telephone terminal based on the calling telephone number of an outgoing telephone terminal issuing a line connecting request, and relays the line connecting request to the fixed-line extension telephone (see Japanese Laid-open Patent Publication No. 09-224089, for example).

However, the above telephone relay systems cannot cope with a situation where a line connecting request from an outgoing telephone terminal is not relayed to the specific telephone terminal of a specific terminal user. To handle such situations, a telephone message recording services and a telephone call transfer services are available today.

Still, urgent line connecting requests cannot be relayed to specific terminal users by a telephone message recording service. Also, line connecting requests are transferred only to a predetermined telephone terminal by a telephone call transfer service. If the telephone terminal is not located in the vicinity of a specific terminal user, an urgent line connecting request cannot be relayed to the specific terminal user either.

SUMMARY

The present invention has been made in view of the above circumstances, and provides a telephone relay apparatus that can minimize the probability that an urgent line connecting request from an outgoing telephone terminal is not relayed to a specific terminal user. The present invention also provides a telephone relay system that includes the telephone relay apparatus, and a recording medium and a data processing method to be executed and implemented in the telephone relay apparatus.

In one embodiment, there is provided a telephone relay system including: a specific storing unit that stores the specific telephone number of at least one specific telephone terminal that is regularly used by a specific terminal user; a periphery storing unit that stores the peripheral telephone number of each peripheral telephone terminal expected to exist in the vicinity of the specific terminal user, the peripheral telephone number being stored together with periphery requirement data; a schedule storing unit that stores user scheduled data containing at least one piece of the periphery requirement data for each scheduled date about the specific terminal user; a request receiving unit that receives a line connecting request from the outgoing telephone terminal of a telephone outgoing user to the specific telephone terminal; a specific line connecting unit that tries to open the telephone call line from the outgoing telephone terminal to the specific telephone terminal with the use of the specific telephone number in response to the line connecting request; a requirement acquiring unit that acquires at least one piece of the periphery requirement data from the user scheduled data about the specific terminal user having the scheduled date matching a present date, when the telephone call line is not opened; a periphery selecting unit that selects at least one of the peripheral telephone terminals in accordance with one or more pieces of periphery requirement data acquired; and a telephone call unit that tries to open the telephone call line from the outgoing telephone terminal to the selected peripheral telephone terminal, with the use of the peripheral telephone number.

In another embodiment, there is provided a telephone relay apparatus including: a specific storing unit that stores the specific telephone number of at least one specific telephone terminal that is regularly used by a specific terminal user; a periphery storing unit that stores the peripheral telephone number of each peripheral telephone terminal expected to exist in the vicinity of the specific terminal user, the peripheral telephone number being stored together with periphery requirement data; a request receiving unit that receives a line connecting request from the outgoing telephone terminal of a telephone outgoing user to the specific telephone terminal; a specific line connecting unit that tries to open the telephone call line from the outgoing telephone terminal to the specific telephone terminal with the use of the specific telephone number in response to the line connecting request; a requirement acquiring unit that acquires at least one piece of the periphery requirement data from user scheduled data about the specific terminal user having a scheduled date matching a present date, when the telephone call line is not opened; a periphery selecting unit that selects at least one of the peripheral telephone terminals in accordance with one or more pieces of periphery requirement data acquired; and a telephone call unit that tries to open the telephone call line from the outgoing telephone terminal to the selected peripheral telephone terminal, with the use of the peripheral telephone number.

In yet another embodiment, there is provided a recording medium causing a computer in a telephone relay apparatus to: store the specific telephone number of at least one specific telephone terminal that is regularly used by a specific terminal user; store the peripheral telephone number of each peripheral telephone terminal expected to exist in the vicinity of the specific terminal user, the peripheral telephone number being stored together with periphery requirement data; receive a line connecting request from the outgoing telephone terminal of a telephone outgoing user to the specific telephone terminal; try to open the telephone call line from the outgoing telephone terminal to the specific telephone terminal with the use of the specific telephone number in response to the line connecting request; acquire at least one piece of the periphery requirement data from user scheduled data about the specific terminal user having a scheduled date matching a present date, when the telephone call line is not opened; select at least one of the peripheral telephone terminals in accordance with one or more pieces of periphery requirement data acquired; and try to open the telephone call line from the outgoing telephone terminal to the selected peripheral telephone terminal, with the use of the peripheral telephone number.

In still another embodiment, there is provided a data processing method to be implemented in a telephone relay apparatus including: storing the specific telephone number of at least one specific telephone terminal that is regularly used by a specific terminal user; storing the peripheral telephone number of each peripheral telephone terminal expected to exist in the vicinity of the specific terminal user, the peripheral telephone number being stored together with periphery requirement data; receiving a line connecting request from the outgoing telephone terminal of a telephone outgoing user to the specific telephone terminal; trying to open the telephone call line from the outgoing telephone terminal to the specific telephone terminal with the use of the specific telephone number in response to the line connecting request; acquiring at least one piece of the periphery requirement data from user scheduled data about the specific terminal user having a scheduled date matching a present date, when the telephone call line is not opened; selecting at least one of the peripheral telephone terminals in accordance with one or more pieces of periphery requirement data acquired; and trying to open the telephone call line from the outgoing telephone terminal to the selected peripheral telephone terminal, with the use of the peripheral telephone number.

The respective components of the present invention may be designed to embody their functions. For example, those components may be realized by special-purpose hardware having predetermined functions, a telephone relay apparatus having the predetermined functions provided by a recording medium, the predetermined functions embodied in a telephone relay apparatus by a recording medium, a combination of those functions, or the like.

The respective components of the present invention do not need to be independent of one another. Rather, two or more components may be formed into one member. Also, one component may be formed with two or more members. Further, one component may be part of another component, or part of one component may overlap with part of another component.

Although the procedures in the data processing method of the present invention are described in order, the order does not restrict the actual order of the procedures to be carried out. Therefore, when the data processing method of the present invention is implemented, the order of the procedures to be carried out may be changed within such a scope that the contents of the procedures do not contradict one another.

In the data processing method of the present invention, the procedures may not be carried out in different timings from one another. Therefore, a procedure may be carried out while another procedure is being carried out, or part of the timing of one procedure may overlap with part of the timing of another procedure, or the timing of one procedure may be completely the same as the timing of another procedure.

The telephone relay apparatus of the present invention may be embodied by hardware formed with general-purpose apparatus such as a Central Processing Unit (CPU), a Read Only Memory (ROM), a Random Access Memory (RAM), an interface unit (I/F), and the likes, or may be embodied by a special-purpose logic circuit designed to perform a predetermined operation, or may be embodied by a combination of the hardware and the logic circuit.

In a telephone relay system of the present invention, a specific storing unit stores the specific telephone number of at least one specific telephone terminal that is regularly used by a specific terminal user. A periphery storing unit stores the peripheral telephone number of each peripheral telephone terminal expected to exist in the vicinity of the specific terminal user, together with periphery requirement data. A schedule storing unit stores user scheduled data containing at least one piece of the periphery requirement data for each scheduled date about the specific terminal user. When a request receiving unit receives a line connecting request from the outgoing telephone terminal of a telephone outgoing user to the specific telephone terminal, a specific line connecting unit tries to open the telephone call line from the outgoing telephone terminal to the specific telephone terminal with the use of the specific telephone number in response to the line connecting request. A requirement acquiring unit acquires at least one piece of the periphery requirement data from the user scheduled data about the specific terminal user having the scheduled date matching a present date, when the telephone call line is not opened. A periphery selecting unit selects at least one of the peripheral telephone terminals in accordance with the one or more pieces of periphery requirement data. A telephone call unit tries to open the telephone call line from the outgoing telephone terminal to the selected peripheral telephone terminal, with the use of the peripheral telephone number. As an outgoing telephone terminal not connected to a specific telephone terminal is connected to a peripheral telephone terminal, it is possible to improve the probability that the telephone outgoing user and the specific terminal user can talk to each other between the peripheral telephone terminal and the outgoing telephone terminal.

BRIEF DESCRIPTION OF THE DRAWINGS

The above and other objects, advantages and features of the present invention will be more apparent from the following description of certain preferred embodiments taken in conjunction with the accompanying drawings, in which:

FIG. 3 is a schematic view of the memory structure of a telephone number list that serves as the specific storing unit and the periphery storing unit;

FIGS. 4A and 4B are schematic views of the memory structure of the user scheduled data;

DETAILED DESCRIPTION

The invention will be now described herein with reference to illustrative embodiments. Those skilled in the art will recognize that many alternative embodiments can be accomplished using the teachings of the present invention and that the invention is not limited to the embodiments illustrated for explanatory purposes.

Figure 1:
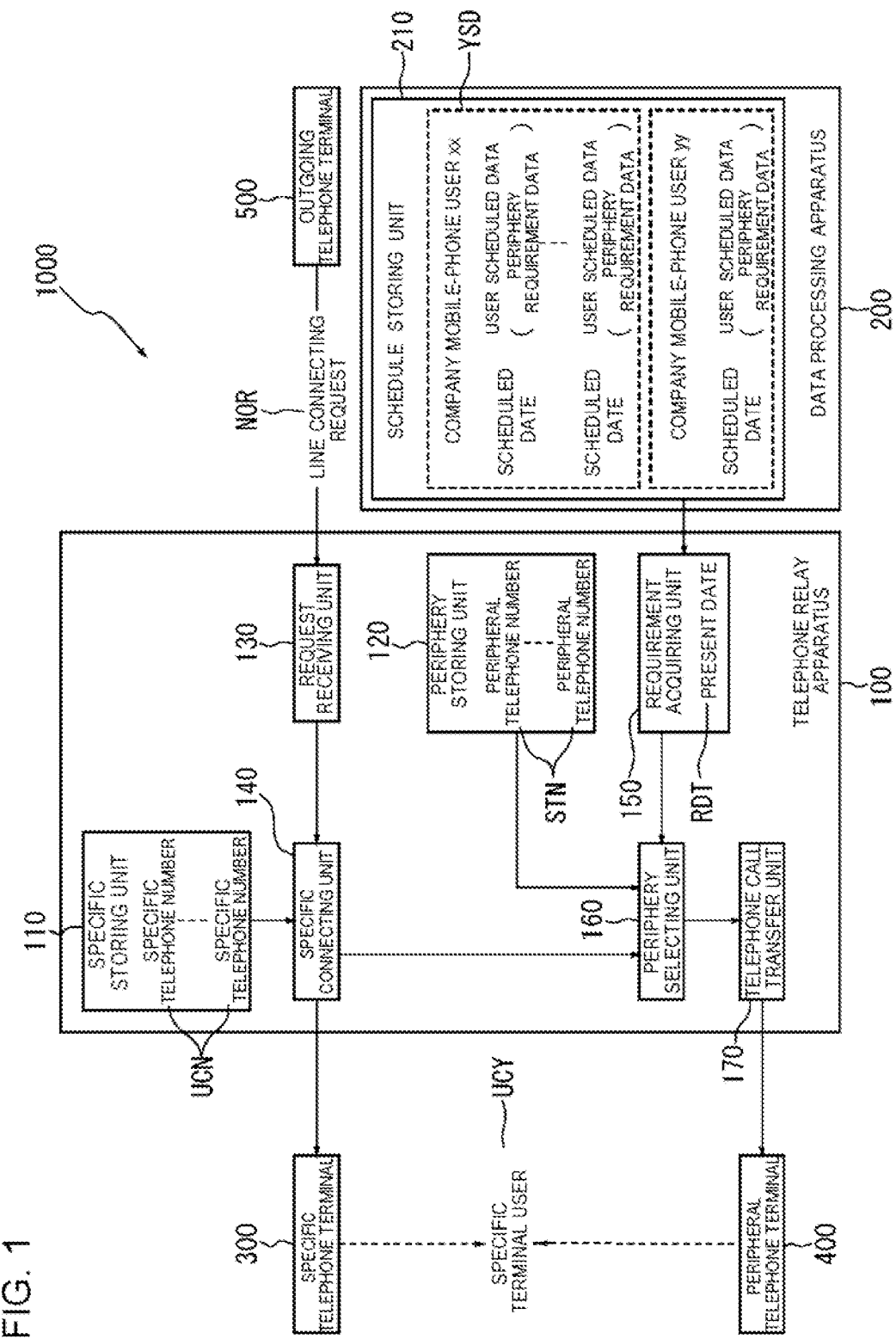
FIG. 1 is a block diagram schematically showing the logic structure of a telephone relay system in accordance with an embodiment of the present invention.

The following is a description of an embodiment of the present invention, with reference to the accompanying drawings. As shown in FIG. 1, a telephone relay system 1000 of this embodiment includes a specific storing unit 110, a periphery storing unit 120, a schedule storing unit 210, a request receiving unit 130, a specific line connecting unit 140, a requirement acquiring unit 150, a periphery selecting unit 160, and a telephone call unit 170. The specific storing unit 110 stores the specific telephone number UCN of at least one-specific telephone terminal 300 that is regularly used by a specific terminal user UCY. The periphery storing unit 120 stores the peripheral telephone number STN of each peripheral telephone terminal 400 expected to exist in the vicinity of the specific terminal users UCY, together with periphery requirement data. The schedule storing unit 210 stores user scheduled data YSD, containing at least one piece of periphery requirement data for each scheduled date SDT about the specific terminal user UCY. The request receiving unit 130 receives a line connecting request NOR from an outgoing telephone terminal 500 of a telephone outgoing user OTY to the specific telephone terminal 300. The specific line connecting unit 140 tries to open a telephone call line from the outgoing telephone terminal 500 to the specific telephone terminal 300 with the use of the specific telephone number UCN in response to the received line connecting request NOR. The requirement acquiring unit 150 acquires at least one piece of periphery requirement data from the user scheduled data YSD about the specific terminal user USY of the specific telephone terminal 300 having a scheduled date SDT matching the present date RDT, when the telephone call line is not opened. The periphery selecting unit 160 selects at least one peripheral telephone terminal 400 in accordance with the acquired one or more pieces of periphery requirement data. The telephone call unit 170 tries to open a telephone call line from the outgoing telephone terminal 500 to the selected peripheral telephone terminal 400, with the use of the peripheral telephone number STN.

Figure 2:
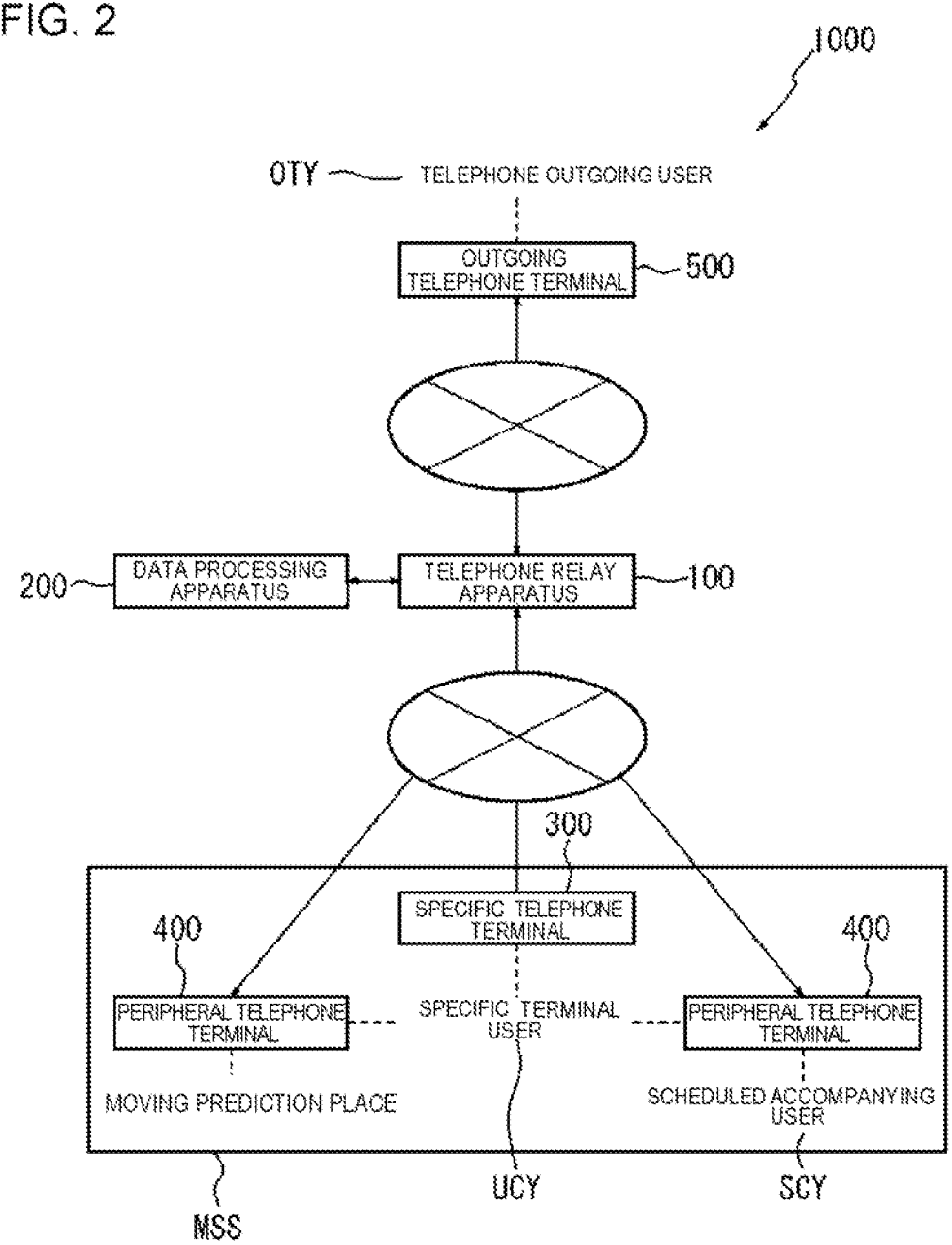
FIG. 2 is a block diagram showing the physical structure of the telephone relay system.

More specifically, as shown in FIGS. 1 and 2, the telephone relay system 1000 of this embodiment has a telephone relay apparatus 100 and a data processing apparatus 200. The data processing apparatus 200 may be formed with a database server, for example, and is provided in a predetermined company.

The data processing apparatus 200 includes the schedule storing unit 210, and has data communications with the telephone relay apparatus 100. Therefore, the telephone relay apparatus 100 includes the specific storing unit 110, the periphery storing unit 120, the request receiving unit 130, the specific line connecting unit 140, the requirement acquiring unit 150, the periphery selecting unit 160, and the telephone call unit 170. The telephone relay apparatus 100 tries to open telephone call lines from the outgoing telephone terminal 500 to the specific telephone terminal 300 and the periphery telephone terminals 400.

The telephone relay apparatus 100 may be formed with a digital PBX (Private Branch exchange) server, for example, and is provided together with the data processing unit 200 in the predetermined company.

At least some of the employees of the company are specific terminal users UCY. Scheduled accompanying user s SCY located in the vicinities of the specific terminal users UCY are also employees of the company.

For example, the specific terminal users UCY are department managers and assistant managers of the company, and the scheduled accompanying users SCY are the secretaries and subordinates of those managers. It is not necessary to designate the specific terminal users UCY and the scheduled accompanying users SCY in an unchangeable manner.

Accordingly, there might be an employee who is a specific terminal user UCY for a scheduled accompanying user SCY, while being a scheduled accompanying user SCY for a specific terminal user UCY.

Each specific terminal user UCY always carries a so-called mobile-phone unit as the specific telephone terminal 300. Each scheduled accompanying user SCY also always carries a mobile-phone unit as the peripheral telephone terminal 400.

The specific telephone terminals 300 and the peripheral telephone terminals 400 may be owned by individuals or may be leased from the company. Meanwhile, the specific telephone numbers UCN and the peripheral telephone numbers STN are registered in the telephone relay apparatus 100.

The company has more than one moving prediction place such as a conference room, and a fixed-line telephone or an Internet Protocol (IP) Telephone is provided as a peripheral telephone terminal 400 at each of those locations. The moving prediction places MSS may further include a factory, a conference room of an affiliate company, or the like, and the peripheral telephone terminals 400 may be provided at those locations.

The telephone relay apparatus 100 and the data processing apparatus 200 are formed with hardware including a Central Processing Unit (CPU), a Hard Disc Drive (HDD), and an interface unit (I/F), and have a certain recording medium installed therein as the software. Each of parts of the hardware performs an operation in accordance with the recording medium, so as to logically realize the above described components 110 through 170 and 210.

For example, the specific storing unit 110, the periphery storing unit 120, the schedule storing unit 210, and the likes are equivalent to a memory area formed in the HDD or the like so as to be recognized by the CPU or the like in accordance with the recording medium, as will be described later in detail.

The request receiving unit 130 is equivalent to the function of the CPU or the like to recognize data reception by the interface unit in accordance with the recording medium. The specific line connecting unit 140 and the telephone call unit 170 are equivalent to the function of the CPU or the like to control data communications of the interface unit in accordance with the recording medium. The periphery selecting unit 160 is equivalent to the function of the CPU or the like to perform predetermined data processing in accordance with the recording medium.

The periphery storing unit 120 stores the periphery requirement data together with the peripheral telephone numbers STN. The periphery requirement data includes the data about the moving prediction places MSS at which peripheral telephone terminals 400 are provided and specific terminal users UCY may be located.

More specifically, as shown in FIG. 3, the ID data about the specific terminal users UCY, the scheduled accompanying users SCY, the moving prediction places MSS, and the likes are registered for the respective telephone numbers that can be the specific telephone numbers UCN and the peripheral telephone numbers STN in the specific storing unit 110 and the periphery storing unit 120 in the telephone relay apparatus 100.

On the other hand, the schedule storing unit 210 of the data processing apparatus 200 stores the user scheduled data YSD containing the data about the moving prediction places MSS and the scheduled accompanying users SCY as the periphery requirement data. More specifically, the schedule storing unit 210 is formed by an application program such as a scheduler in the data processing apparatus 200, as shown in FIGS. 4A and 4B.

In the schedule storing unit 210, the user scheduled data YSD is registered for the respective specific terminal users UCY, and is freely edited by the respective specific terminal users UCY. The user scheduled data YSD contains the data about the moving prediction places MSS and the scheduled accompanying users SCY for the respective scheduled dates SDT.

When a telephone call line is not opened, the requirement acquiring unit 150 acquires the data about a moving prediction place MSS and a scheduled accompanying user SCY from the user scheduled data YSD in which the scheduled date SDT of the specific terminal user UCY of the specific telephone terminal 300 matches the present date RDT. The periphery selecting unit 160 then selects the peripheral telephone terminal 400 of the moving prediction place MSS and the scheduled accompanying user SCY indicated by the acquired data.

The telephone call unit 170 transmits a guidance message to the opened telephone call line to the peripheral telephone terminal 400. The guidance message concerns the line connecting request NOR from the outgoing telephone terminal 500 to the specific telephone terminal 300. Here, the telephone call unit 170 generates and transmits the guidance message containing the name of the specific terminal user UCY and the calling telephone number of the outgoing telephone terminal 500.

The above described components of the telephone relay apparatus 100 are logically realized by the various kinds of hardware performing various operations in accordance with a recording medium.

Such a recording medium is written so as to cause the telephone relay apparatus 100 to perform a specific storing operation, a periphery storing operation, a request receiving operation, a specific line connecting operation, a requirement acquiring operation, a periphery selecting operation, and a telephone call transfer operation, for example. In the specific storing operation, the specific telephone number UCN of at least one specific telephone terminal 300 that is regularly used by a specific terminal user UCY is stored. In the periphery storing operation, the peripheral telephone number STN of each peripheral telephone terminal 400 expected to exist in the vicinity of the specific terminal users UCY is stored together with periphery requirement data. In the request receiving operation, a line connecting request NOR from an outgoing telephone terminal 500 of a telephone outgoing user OTY to the specific telephone terminal 300 is received. In the specific line connecting operation, opening of a telephone call line from the outgoing telephone terminal 500 to the specific telephone terminal 300 is tried with the use of the specific telephone number UCN in response to the received line connecting request NOR. In the requirement acquiring operation, at least one piece of periphery requirement data is acquired from the user scheduled data YSD in which the scheduled date SDT of the specific terminal user UCY of the specific telephone terminal 300 matches the present date RDT, when the telephone call line is not opened. In the periphery selecting operation, at least one peripheral telephone terminal 400 is selected in accordance with the acquired one or more pieces of periphery requirement data. In the telephone call transfer operation, opening of a telephone call line from the outgoing telephone terminal 500 to the selected peripheral telephone terminal 400 is tried with the use of the peripheral telephone number STN.

The data processing and the likes to be performed by the telephone relay apparatus 100 of this embodiment in the above described structure is now described. First, a telephone outgoing user OTY such as a client uses an outgoing telephone terminal 500 such as a mobile-phone unit, to call a specific telephone terminal 300 such as a company mobile-phone unit of a specific terminal user UCY. The telephone relay apparatus 100 relays the call.

Figure 5:
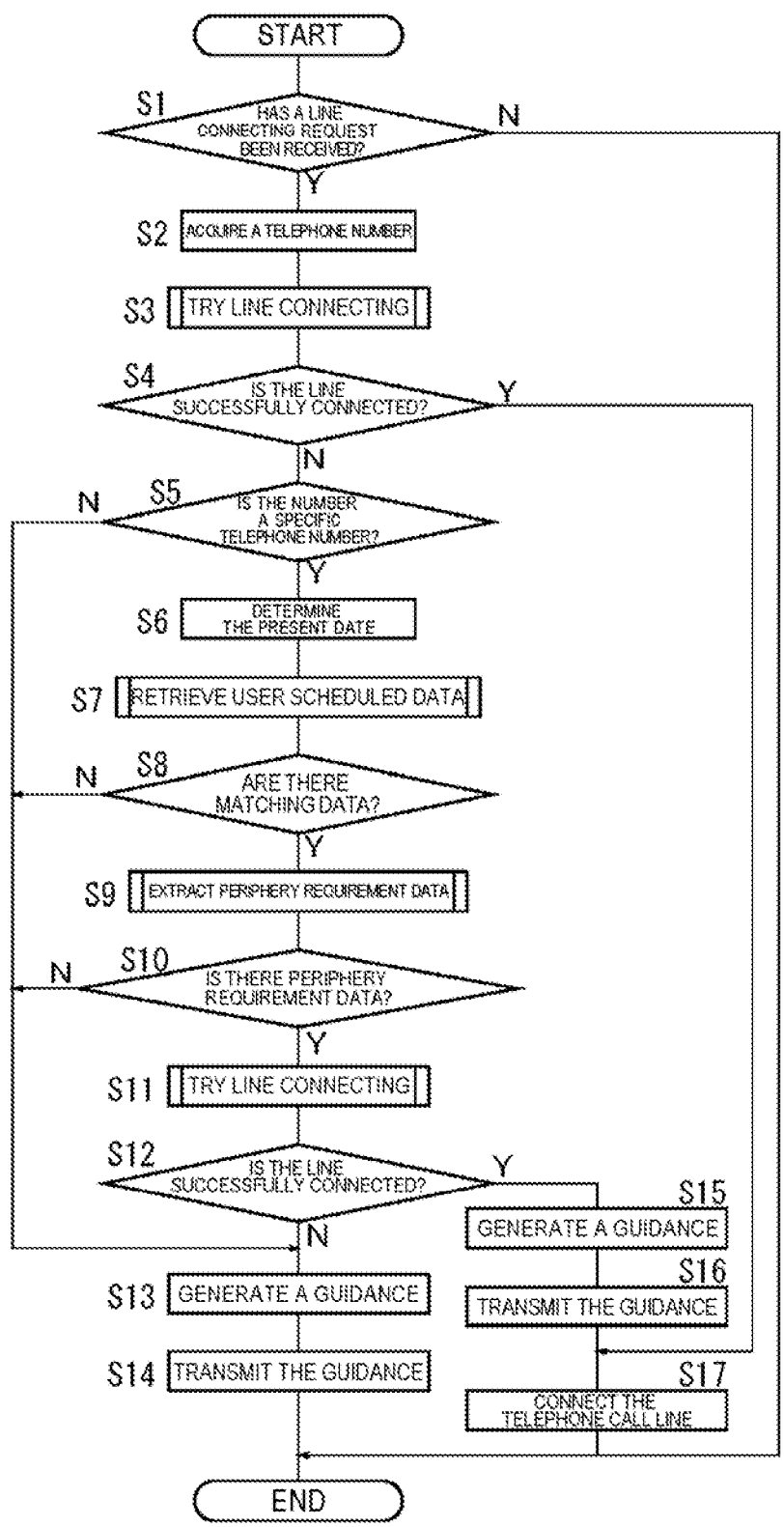
FIG. 5 is a flowchart showing a data processing method to be implemented by the telephone relay apparatus.

As shown in FIG. 5, the telephone relay apparatus 100 acquires the specific telephone number UCN in response to a line connecting request NOR to the call-receiving specific telephone terminal 300 (steps S1—Y and S2). Using the specific telephone number UCN, the telephone relay apparatus 100 tries to open a telephone call line to the specific telephone terminal 300 (step 33).

When the telephone call line is successfully opened (step S4—Y), the telephone outgoing user OTY and the specific terminal user UCY talk to each other over the telephone call line (step S17). If the telephone call line is not opened after a predetermined number of calls are tried, the telephone relay apparatus 100 determines that the line connecting has failed (step S4—N).

In such a case, the telephone relay apparatus 100 checks whether the call destination is a specific telephone terminal 300. If the call destination is not a specific telephone terminal 300 (step S5—N), the telephone relay apparatus 100 generates and transmits a guidance message, "Your call cannot be completed at the moment. Please try again later.", for example (steps S13 and S14).

If the call destination is a specific telephone terminal 300 (step S5—Y), the requirement acquiring unit 150 identifies the present date RDT (step S6). The requirement acquiring unit 150 of the telephone relay apparatus 100 then accesses the schedule storing unit 210 of the data processing apparatus 200, and searches for the user scheduled data YSD about the specific terminal user UCY having a scheduled date SDT matching the present date RDT (step S7).

If the corresponding user scheduled data YSD is not detected (step S8—N), the telephone relay apparatus 100 generates and transmits the guidance message, "Your call cannot be completed at the moment. Please try again later.", for example (steps S13 and 14).

If the user scheduled data YSD having a scheduled date SDT matching the present date RDT is detected (step S8—Y) the periphery requirement data is extracted from the user scheduled data YSD (step S9).

The periphery requirement data contains the data about the specific terminal users UCY, the scheduled accompanying users SCY, the moving prediction places MSS, and the likes. The periphery requirement data is extracted by performing matching processing with the use of a particular keyword. If the periphery requirement data is not extracted (step S10—N), the above mentioned guidance message is generated and transmitted (steps S13 and S14).

If the periphery requirement data is extracted from the user scheduled data YSD (step S10—Y), opening of a telephone call line to the peripheral telephone number STN is tried with the use of the periphery requirement data.

For example, in a case where a telephone call line to the specific telephone terminal 300 of a specific terminal user UCY registered in the specific storing unit 110 is not opened with the corresponding specific telephone number UCN, the user scheduled data YSD about the specific terminal user UCY is read out.

For example, as shown in FIG. 4A, if the present date is "01 (Mon), 10 o'clock", "conference room XX" is extracted as the moving prediction place MSS of the periphery requirement data. The peripheral telephone number STN of the peripheral telephone terminal 400 at the moving prediction place MSS is then detected from the periphery storing unit 120, as shown in FIG. 3, and opening of a telephone call line to the peripheral telephone terminal 400 is tried (step S11).

When the telephone call line is opened (step S12—Y), a guidance message is generated with the use of the telephone number of the outgoing telephone terminal 500 and the identification data about the call-receiving specific terminal user UCY (step S15).

For example, the following guidance message is generated and transmitted: "This call is being transferred from yy (the telephone number of the outgoing telephone terminal 500) to xx (the name of the specific terminal user UCY). Please hand this call on to xx (the name of the specific terminal user UCY) or tell xx to call yy (the telephone number of the outgoing telephone terminal 500)." (steps S15 and S16).

When the transmission of the above guidance message is completed, the telephone all line is opened (step S17) Accordingly, even if someone in a meeting answers the peripheral telephone terminal 400, the specific terminal user UCY can use the peripheral telephone terminal 400 to talk to the telephone outgoing user OTY of the outgoing telephone terminal 500 without any problem.

Likewise, in a case where a telephone call line to the specific telephone terminal 300 of another specific terminal user UCY is not opened with the use of the corresponding specific telephone number UCN, "user XX" is extracted as the scheduled accompanying user SCY of the periphery requirement data, if the present date is "02 (Tue) 13 o'clock", as shown in FIG. 4B.

The peripheral telephone number STN of the peripheral telephone terminal 400 carried by the scheduled accompanying user SCY is then detected from the periphery storing unit 120, as shown in FIG. 3, and opening of a telephone call line is tried (step S11).

When the telephone call-line is opened (stop S12—Y) a guidance message is generated and transmitted with the use of the telephone number of the outgoing telephone terminal 500 and the identification data about the call-receiving specific terminal user UCY (steps 15 and 16) as described above, and the telephone call line is opened (step S17).

Accordingly, the scheduled accompanying user SCY can lend his/her peripheral telephone terminal 400 to the specific terminal user UCY, or notify the specific terminal user UCY of the telephone number of the outgoing telephone terminal 500, so that the specific terminal user UCY can talk to the telephone outgoing user OTY on the phone.

In the telephone relay apparatus 100 of this embodiment, the specific telephone number UCN of at least one specific telephone terminal 300 that is regularly used by a specific terminal user UCY is stored in the specific storing unit 110, as described above. Further, the peripheral telephone number STN of each of the peripheral telephone terminals 400 expected to exist in the vicinities of the specific terminal users UCY is stored together with the periphery requirement data in the periphery storing unit 120.

In the data processing apparatus 200 of this embodiment, the user scheduled data YSD including at least one piece of periphery requirement data about each scheduled date SDT of the specific terminal users UCY is stored in the schedule storing unit 210.

When the request receiving unit 130 receives a line connecting request NOR from the outgoing telephone terminal 500 of a telephone outgoing user OTY to a specific telephone terminal 300 in this situation, the specific line connecting unit 140 tries to open a telephone call line from the outgoing telephone terminal 500 to the specific telephone terminal 300 with the use of the corresponding specific telephone number UCN in response to the received line connecting request NOR.

While, if the telephone call line is not opened, the requirement acquiring unit 150 acquires at least one piece of periphery requirement data from the user scheduled data YSD about the specific terminal user UCY of the specific telephone terminal 300 having a scheduled date SDT matching the present date RDT.

The periphery selecting unit 160 then selects at least one peripheral telephone terminal 400 in accordance with the acquired one or more pieces of periphery requirement data. The telephone call unit 170 tries to open a telephone call line from the outgoing telephone terminal 500 to the selected peripheral telephone terminal 400 with the use of the corresponding peripheral telephone number STN.

The outgoing telephone terminal 500 unconnected to the specific telephone terminal 300 is connected to the peripheral telephone terminal 400 in this manner. Accordingly, it is possible to increase the possibility that the telephone outgoing user OTY and the specific terminal user UCY can talk to each other between the peripheral telephone terminal 400 and the outgoing telephone terminal 500. Thus, it is possible to minimize the probability that an urgent line connecting request NOR from an outgoing telephone terminal 500 does not reach the subject specific terminal user UCY.

Furthermore, a peripheral telephone terminal 100 that refers to the user scheduled data YSD changing daily and s a telephone call line is selected. Accordingly, a telephone call line can be opened at extremely high probability, as long as each specific terminal user UCY inputs accurate user scheduled data YSD.

In the telephone relay apparatus 100 in such a situation, the moving prediction places MSS and the scheduled accompanying users SCY are registered together with the peripheral telephone number STN of each peripheral telephone terminal 400, and the periphery requirement data such as the data about the moving prediction places MSS and the scheduled accompanying users SCY is registered in the user scheduled data YSD in the data processing apparatus 200, as in a conventional case.

With this arrangement, an appropriate peripheral telephone terminal 400 is detected from the user scheduled data YSD through a simple data processing operation such as a keyword search. Accordingly, the specific terminal users UCY do not need to register the peripheral telephone numbers STN of the peripheral telephone terminals 400 in the user scheduled data YSD. Thus, the registration and management can be simplified.

Especially, no special, data registration is required in the telephone relay apparatus 100 and the data processing apparatus 200 as described above. Accordingly, the telephone relay system 1000 can be formed with the conventional telephone relay apparatus 100 and the data processing apparatus 200.

Furthermore, when a telephone call line to a peripheral telephone terminal 400 is opened in response to a line connecting request NOR from an outgoing telephone terminal 500 to a specific terminal user UCY, a guidance message containing the name of the specific terminal user UCY and the calling telephone number of the outgoing telephone terminal 500 is generated and transmitted.

Accordingly, when a peripheral telephone terminal 400 carried by a scheduled accompanying user SCY or a peripheral telephone terminal 400 placed in a conference room or the like is called, the scheduled accompanying user SCY can instantly recognize from whom the line connecting request NOR is issued to whom, and can notify the specific terminal user UCY of the identification result.

The present invention is not limited to this embodiment, and various changes and modifications may be made to it without departing from the scope of the invention. For example, in the above described embodiment, only one piece of periphery requirement data containing the moving prediction places MSS and the scheduled accompanying user s SCY is registered in one piece of user scheduled data YSD.

However, the telephone relay apparatus 100 may include a schedule storing unit (not shown) that stores data about peripheral telephone terminals 400 expected to exist in the vicinities of specific terminal users UCY together with transfer try order. When a telephone call line to a peripheral telephone terminal 400 selected in accordance with the periphery requirement data is not opened, the peripheral telephone terminals 400 may be selected in the stored transfer try order.

For example, more than one piece of periphery requirement data, such as "a meeting with user zz and user yy in conference room xx", may be registered in one piece of user scheduled data YSD. In that case, opening of telephone call lines in accordance with the two or more pieces of periphery requirement data may be tried simply in sequential order or in predetermined transfer try order.

The transfer try order may be registered with each specific terminal user UCY. Alternatively, a common rule (not shown), such as a rule in which a fixed-line telephone terminal in the conference room is the first, the mobile-phone unit of a subordinate is the second, and the mobile-phone unit of a boss is the third, may be set among the specific terminal users UCY, for example.

One piece of the user scheduled data YSD may be a transfer list that contains transfer destinations of telephone call lines. In such a case, the specific terminal users UCY register the periphery requirement data such as the moving prediction places MSS and the scheduled accompanying user s SCY in the transfer try order, but do not need to register the peripheral telephone numbers STN.

Figure 6:
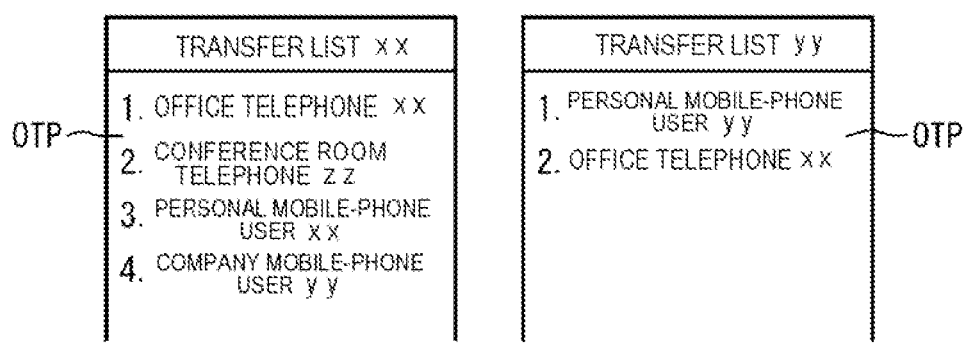
FIG. 6 is a schematic view of the memory structure of a transfer list that serves as the schedule storing unit in a modification.

Such transfer lists OTP may be registered for the respective specific terminal users UCY, as shown in FIG. 6, and may be set in the user scheduled data YSD if necessary. In such a case, if a meeting between the user zz and the user yy in the conference room xx is often held, smooth transfer of telephone call lines can be readily set.

In the above embodiment, when a telephone call line to a selected peripheral telephone terminal 400 is not opened, the telephone relay apparatus 100 acquires periphery requirement data from the user scheduled data YSD having a scheduled date SDT matching the present date RDT, and selects another peripheral telephone terminal 400.

However, when a telephone call line to a selected peripheral telephone terminal 400 is not opened, periphery requirement data may be obtained from the user scheduled data YSD having a scheduled date SDT around the present date RDT (not shown).

For example, even in a case where a specific terminal user UCY is ahead of or behind schedule, a telephone call line to a peripheral telephone terminal 400 of the specific terminal user UCY can be opened in this case.

In such a telephone relay apparatus (not shown), periphery requirement data may be obtained from the user scheduled data YSD having a scheduled date SDT only a predetermined period of time ahead of or behind the present date RDT (not shown). Accordingly, opening of a telephone call line is not tried with the use of user scheduled data YSD that is unreasonably out of time.

When a telephone call line to a selected peripheral telephone terminal 400 is not opened, periphery requirement data may be obtained from the user scheduled data YSD having a scheduled date SDT around the present date RDT, with the scheduled date SDT indicating the same clock time as the present date RDT (not shown).

In this case, even in a case where a specific terminal user UCY inputs a wrong date slightly ahead of or behind the actual date for the user scheduled data YSD or where the specific terminal user UCY partially fails to input the schedule few days in a row, a telephone call line to a peripheral telephone terminal 400 of the specific terminal user UCY can be opened.

In the above embodiment, the telephone relay apparatus 100 formed with a digital PBX server is formed independently of the data processing apparatus 200 formed with a database server, and the telephone relay apparatus 100 and the data processing apparatus 200 constitute the telephone relay system 1000. However, the telephone relay apparatus 100 and the data processing apparatus 200 may be formed into one apparatus, or each or one of the apparatuses may be formed with two or more apparatuses (not shown).

In the above embodiment, the respective components of the telephone relay apparatus 100 are logically realized as various functions by a recording medium. However, each of the components may be formed in the form of hardware, or may be realized by a combination of software and hardware.

It is of course possible to combine the above embodiment and modifications within such a scope that the contents of them do not contradict one another. Although the respective components of the above embodiment and modifications have been described in detail, various changes may be made to them within the scope of the invention.

It is apparent that the present invention is not limited to the above embodiment, and may be modified and changed without departing from the scope and spirit of the invention.

What is claimed is:

1. A telephone relay system comprising:
a specific storing unit that stores a specific telephone number of at least one specific telephone terminal that is regularly used by a specific terminal user;
a periphery storing unit that stores a peripheral telephone number of each peripheral telephone terminal expected to exist in the vicinity of said specific terminal user, said peripheral telephone number being stored together with periphery requirement data;
a schedule storing unit that stores user scheduled data containing at least one piece of said periphery requirement data for each scheduled date about said specific terminal user;
a request receiving unit that receives a line connecting request from an outgoing telephone terminal of a telephone outgoing user to said specific telephone terminal;
a specific line connecting unit that tries to open a telephone call line from said outgoing telephone terminal to said specific telephone terminal with the use of said specific telephone number in response to said line connecting request;
a requirement acquiring unit that acquires at least one piece of said periphery requirement data from said user scheduled data about said specific terminal user having said scheduled date matching a present date, when said telephone call line is not opened;
a periphery selecting unit that selects at least one of said peripheral telephone terminals in accordance with said one or more pieces of periphery requirement data acquired; and a telephone call unit that tries to open said telephone call line from said outgoing telephone terminal to said selected peripheral telephone terminal, with the use of said peripheral telephone number;

wherein:

said periphery storing unit stores a scheduled accompanying user who carries said peripheral telephone terminal and accompanies said specific terminal user, said scheduled accompanying user being stored as at least one piece of said periphery requirement data together with said peripheral telephone number;

said schedule storing unit stores said user scheduled data containing said scheduled accompanying user as said periphery requirement data;

said requirement acquiring unit acquires said scheduled accompanying user from said user scheduled data about said specific terminal user of said specific telephone terminal having said scheduled date matching said present date, when said telephone call line is not opened; and said periphery selecting unit selects said peripheral telephone terminal of said acquired scheduled accompanying user.

2. The telephone relay system as claimed in claim 1, wherein, when said telephone call line to said selected peripheral telephone terminal is not opened, said requirement acquiring unit acquires said periphery requirement data from said user scheduled data having said scheduled date around present time.

3. The telephone relay system as claimed in claim 2, wherein said requirement acquiring unit acquires said periphery requirement data from said user scheduled data having said scheduled date a predetermined period of time ahead of or behind said present date.

4. The telephone relay system as claimed in claim 1, wherein, when said telephone call line to said selected peripheral telephone terminal is not opened, said requirement acquiring unit acquires said periphery requirement data from said user scheduled data having said scheduled date that is around said present date and indicates the same clock time as said present date.

5. The telephone relay system as claimed in claim 1, wherein, when a plurality of said peripheral telephone terminals are selected, said telephone call unit tries to open said telephone call lines in predetermined order.

6. The telephone relay system as claimed in claim 5, wherein said periphery storing unit stores said predetermined order in which opening of said telephone call lines is tried when a plurality of said peripheral telephone terminals are selected, said predetermined order being stored as a piece of said periphery requirement data.

7. The telephone relay system as claimed in claim 1, further comprising a schedule storing unit that stores data about a plurality of said peripheral telephone terminals located in the vicinity of said specific terminal user, the data about said peripheral telephone terminals being stored together with transfer try order, wherein said periphery selecting unit selects said peripheral telephone terminals in said stored transfer try order, when said telephone call line to said peripheral telephone terminal selected by said periphery requirement data is not opened.

8. The telephone relay system as claimed in claim 1, wherein said telephone call unit transmits a guidance message about a line connecting request from said outgoing telephone terminal to said specific telephone terminal, said guidance message being transmitted to said telephone call line to said opened peripheral telephone terminal.

9. The telephone relay system as claimed in claim 8, wherein said telephone call unit generates and transmits said guidance message containing a name of said specific terminal user.

10. The telephone relay system as claimed in claim 8, wherein said telephone call unit generates and transmits said guidance message containing a calling telephone number of said outgoing telephone terminal.

11. The telephone relay system as claimed in claim 1, comprising:

a telephone relay apparatus that includes at least said specific storing unit, said periphery storing unit, said request receiving unit, said specific line connecting unit, said requirement acquiring unit, said periphery selecting unit, and said telephone call unit, said telephone relay apparatus trying to open said telephone call line from said outgoing telephone terminal to said specific telephone terminal and said peripheral telephone terminals; and a data processing apparatus that includes said schedule storing unit and performs data communications with said telephone relay apparatus.

12. A telephone relay apparatus comprising:

a specific storing unit that stores a specific telephone number of at least one specific telephone terminal that is regularly used by a specific terminal user;

a periphery storing unit that stores a peripheral telephone number of each peripheral telephone terminal expected to exist in the vicinity of said specific terminal user, said peripheral telephone number being stored together with periphery requirement data;

a schedule storing unit that stores user scheduled data containing at least one piece of said periphery requirement data for each scheduled date about said specific terminal user;

a request receiving unit that receives a line connecting request from an outgoing telephone terminal of a telephone outgoing user to said specific telephone terminal;

a specific line connecting unit that tries to open a telephone call line from said outgoing telephone terminal to said specific telephone terminal with the use of said specific telephone number in response to said line connecting request;

a requirement acquiring unit that acquires at least one piece of said periphery requirement data from said user scheduled data about said specific terminal user having said scheduled date matching a present date, when said telephone call line is not opened;

a periphery selecting unit that selects at least one of said peripheral telephone terminals in accordance with said one or more pieces of periphery requirement data acquired; and a telephone call unit that tries to open said telephone call line from said outgoing telephone terminal to said selected peripheral telephone terminal, with the use of said peripheral telephone number;

wherein said periphery storing unit stores a moving prediction place at which said peripheral telephone terminal is placed and said specific terminal user is located, said expected locating being stored as at least one piece of said periphery requirement data together with said peripheral telephone number;

said requirement acquiring unit acquires said moving prediction place from said user scheduled data about said specific terminal user of said specific telephone terminal having said scheduled date matching said present date, when said telephone call line is not opened;

said periphery selecting unit selects said peripheral telephone terminal located at said acquired moving prediction place;

said periphery storing unit stores a scheduled accompanying user who carries said peripheral telephone terminal and accompanies said specific terminal user, said scheduled accompanying user being stored as at least one piece of said periphery requirement data together with said peripheral telephone number;

said schedule storing unit stores said user scheduled data containing said scheduled accompanying user as said periphery requirement data;

said requirement acquiring unit acquires said scheduled accompanying user from said user scheduled data about said specific terminal user of said specific telephone terminal having said scheduled date matching said present date, when said telephone call line is not opened; and said periphery selecting unit selects said peripheral telephone terminal of said acquired scheduled accompanying user.

13. A non-transitory recording medium causing a computer in a telephone relay apparatus to:

store a specific telephone number of at least one specific telephone terminal that is regularly used by a specific terminal user;

store a peripheral telephone number of each peripheral telephone terminal expected to exist in the vicinity of said specific terminal user, said peripheral telephone number being stored together with periphery requirement data;

store a user scheduled data containing at least one piece of said periphery requirement data for each scheduled date about said specific terminal user;

receive a line connecting request from an outgoing telephone terminal of a telephone outgoing user to said specific telephone terminal;

try to open a telephone call line from said outgoing telephone terminal to said specific telephone terminal with the use of said specific telephone number in response to said line connecting request;

acquire at least one piece of said periphery requirement data from said user scheduled data about said specific terminal user having said scheduled date matching a present date, when said telephone call line is not opened;

select at least one of said peripheral telephone terminals in accordance with said one or more pieces of periphery requirement data acquired; and try to open said telephone call line from said outgoing telephone terminal to said selected peripheral telephone terminal, with the use of said peripheral telephone number;

wherein when storing a peripheral telephone number, said apparatus stores a moving prediction place at which said peripheral telephone terminal is placed and said specific terminal user is located, said expected locating being stored as at least one piece of said periphery requirement data together with said peripheral telephone number;

when acquiring at least one piece of periphery requirement, said apparatus acquires said moving prediction place from said user scheduled data about said specific terminal user of said specific telephone terminal having said scheduled date matching said present date, when said telephone call line is not opened;

when selecting at least one of said peripheral telephone terminals, said apparatus selects said peripheral telephone terminal located at said acquired moving prediction place;

when storing a peripheral telephone number, said apparatus stores a scheduled accompanying user who carries said peripheral telephone terminal and accompanies said specific terminal user, said scheduled accompanying user being stored as at least one piece of said periphery requirement data together with said peripheral telephone number;

when storing a user scheduled data, said apparatus stores said user scheduled data containing said scheduled accompanying user as said periphery requirement data;

when acquiring at least one piece of periphery requirement, said apparatus acquires said scheduled accompanying user from said user scheduled data about said specific terminal user of said specific telephone terminal having said scheduled date matching said present date, when said telephone call line is not opened; and when selecting at least one of said peripheral telephone terminals, said apparatus selects said peripheral telephone terminal of said acquired scheduled accompanying user.

14. A data processing method to be implemented in a telephone relay apparatus, said method comprising:

storing a specific telephone number of at least one specific telephone terminal that is regularly used by a specific terminal user;

storing a peripheral telephone number of each peripheral telephone terminal expected to exist in the vicinity of said specific terminal user, said peripheral telephone number being stored together with periphery requirement data;

storing a user scheduled data containing at least one piece of said periphery requirement data for each scheduled date about said specific terminal user;

receiving a line connecting request from an outgoing telephone terminal of a telephone outgoing user to said specific telephone terminal;

trying to open a telephone call line from said outgoing telephone terminal to said specific telephone terminal with the use of said specific telephone number in response to said line connecting request;

acquiring at least one piece of said periphery requirement data from said user scheduled data about said specific terminal user having said scheduled date matching a present date, when said telephone call line is not opened;

selecting at least one of said peripheral telephone terminals in accordance with said one or more pieces of periphery requirement data acquired; and trying to open said telephone call line from said outgoing telephone terminal to said selected peripheral telephone terminal, with the use of said peripheral telephone number;

wherein when storing a peripheral telephone number, said method stores a moving prediction place at which said peripheral telephone terminal is placed and said specific terminal user is located, said expected locating being stored as at least one piece of said periphery requirement data together with said peripheral telephone number;

when acquiring at least one piece of periphery requirement, said method acquires said moving prediction place from said user scheduled data about said specific terminal user of said specific telephone terminal having said scheduled date matching said present date, when said telephone call line is not opened;

when selecting at least one of said peripheral telephone terminals, said method selects said peripheral telephone terminal located at said acquired moving prediction place;

when storing a peripheral telephone number, said method stores a scheduled accompanying user who carries said peripheral telephone terminal and accompanies said specific terminal user, said scheduled accompanying user being stored as at least one piece of said periphery requirement data together with said peripheral telephone number;

when storing a user scheduled data, said method stores said user scheduled data containing said scheduled accompanying user as said periphery requirement data;

when acquiring at least one piece of periphery requirement, said method acquires said scheduled accompanying user from said user scheduled data about said specific terminal user of said specific telephone terminal having said scheduled date matching said present date, when said telephone call line is not opened; and when selecting at least one of said peripheral telephone terminals, said method selects said peripheral telephone terminal of said acquired scheduled accompanying user.

15. A telephone relay system comprising:

a specific storing unit that stores a specific telephone number of at least one specific telephone terminal that is regularly used by a specific terminal user;

a periphery storing unit that stores a peripheral telephone number of each peripheral telephone terminal expected to exist in the vicinity of said specific terminal user, said peripheral telephone number being stored together with periphery requirement data;

a schedule storing unit that stores user scheduled data containing at least one piece of said periphery requirement data for each scheduled date about said specific terminal user;

a request receiving unit that receives a line connecting request from an outgoing telephone terminal of a telephone outgoing user to said specific telephone terminal;

a specific line connecting unit that tries to open a telephone call line from said outgoing telephone terminal to said specific telephone terminal with the use of said specific telephone number in response to said line connecting request;

a requirement acquiring unit that acquires at least one piece of said periphery requirement data from said user scheduled data about said specific terminal user having said scheduled date matching a present date, when said telephone call line is not opened;

a periphery selecting unit that selects at least one of said peripheral telephone terminals in accordance with said one or more pieces of periphery requirement data acquired; and a telephone call unit that tries to open said telephone call line from said outgoing telephone terminal to said selected peripheral telephone terminal, with the use of said peripheral telephone number;

wherein said periphery storing unit stores a moving prediction place at which said peripheral telephone terminal is placed and said specific terminal user is located, said expected locating being stored as at least one piece of said periphery requirement data together with said peripheral telephone number;

said schedule storing unit stores said user scheduled data containing said moving prediction place as said periphery requirement data;

said requirement acquiring unit acquires said moving prediction place from said user scheduled data about said specific terminal user of said specific telephone terminal having said scheduled date matching said present date, when said telephone call line is not opened; and said periphery selecting unit selects said peripheral telephone terminal located at said acquired moving prediction place, and when said telephone call line to said selected peripheral telephone terminal is not opened, said requirement acquiring unit acquires said periphery requirement data from said user scheduled data having said scheduled date that is around said present date and indicates the same clock time as said present date.

* * * * *